Aug. 26, 1952 R. W. KEENE 2,608,045
QUICK DETACHABLE PICKUP FINGER FOR HARVESTER REELS
Filed Oct. 22, 1949
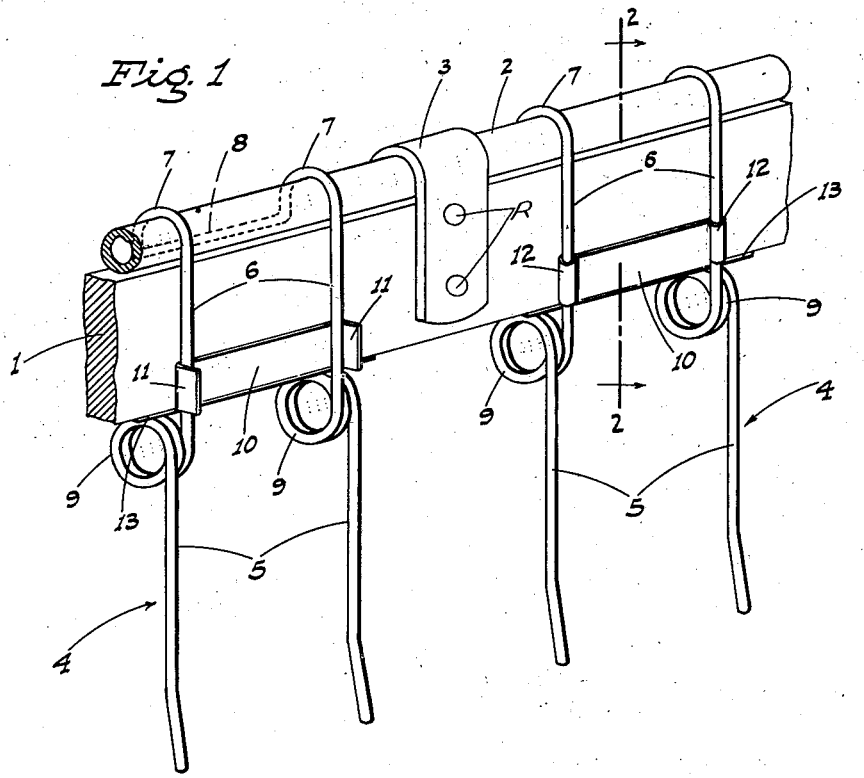
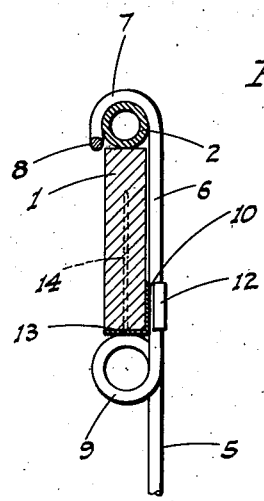
INVENTOR
Ralph W. Keene
BY
ATTORNEYS Patented Aug. 26, 1952

2,608,045

UNITED STATES PATENT OFFICE 2,608,045

QUICK DETACHABLE PICKUP FINGER FOR HARVESTER REELS

Ralph W. Keene, Stockton, Calif.

Application October 22, 1949, Serial No. 122,939

2 Claims. (Cl. 56—400)

1

This invention relates in general to pick-up reels for harvesters.

One object of the invention is to provide a novel pick-up finger for a harvester reel; such finger being adapted for ready initial installation on a bat-bar of a reel, and thereafter being quick-detachable for replacement or repair.

Another object is to provide a pick-up finger, as above, which is normally maintained in rigid attachment to the bat-bar even though quick-detachable therefrom; the finger being strong, and—as mounted—not readily subject to damage.

A further object of the invention is to provide a quick-detachable pick-up finger, as described, which can be removed, and replaced, by hand with only the aid of the tools normally available on a harvester.

An additional object of the invention is to provide a quick-detachable pick-up finger which is designed for ease and economy of manufacture.

Still another object of the invention is to provide a practical and reliable quick-detachable pick-up finger for harvester reels, and yet one which will be exceedingly effective for the purpose for which it is designed.

These objects are accomplished by means of such structure and relative arrangement of parts as will fully appear by a perusal of the following specification and claims.

In the drawings:

Fig. 1 is a fragmentary perspective view of a pick-up reel bat-bar having the improved pick-up fingers mounted thereon.

Fig. 2 is a cross section on line 2—2 of Fig. 1.

Referring now more particularly to the characters of reference on the drawings, the quick-detachable pick-up finger is adapted for use on a harvester reel or the like which includes bat-bars extending from end to end thereof in circumferentially spaced relation; one of said bat-bars being indicated at 1.

In the present embodiment the bat-bar 1 includes, along its upper edge, a metallic rod 2 secured to the bat-bar, at spaced points, by securing clips, one of which is indicated at 3 and which in turn are secured to bar 1 by rivets or bolts R.

Each of the quick-detachable pick-up finger units, of which two are illustrated in Fig. 1, is indicated generally at 4.

Each pick-up finger unit 4 is of double-time type and includes a pair of transversely spaced, outwardly projecting spring tines 5 disposed in parallelism.

The upper portions of the tines 5 comprise

2 shanks 6, each of which has a hook 7 on its upper end adapted to engage in matching relation over the rod 2; the latter being circular in cross section. An integral connecting rod 8 extends between the outer ends of the hooks 7 whereby to maintain the two tines 5 and shanks 6 in their predetermined relationship.

Integral coil springs 9 are formed between corresponding tines 5 and shanks 6, and said springs are offset in the same direction as the hooks 7, and positioned so that said springs immediately underlie the bat-bar 1 when hooks 7 are engaged over rod 2.

Shanks 6 extend down the leading face of bat-bar 1, and an attachment plate 10, corresponding to each finger unit 4, abuts against said face of the bat-bar 1 adjacent its lower edge and spans between and behind the related shanks 6; there being initially out-turned but bendable ears 11 on opposite ends of the attachment plate 10 immediately beyond the shanks. See the attachment plate shown to the left in Fig. 1. These initially outwardly projecting ears 11 are bent over the corresponding shanks 6 to form retention or holding sleeves 12. See the attachment plate shown to the right in Fig. 1.

Each attachment plate 10 includes a right angle flange 13 at its lower edge, which flange projects under and lies against the lower edge of the bat-bar 1, being secured to the latter by suitable means, such as nails indicated at 14.

With pick-up finger units constructed and mounted as above described, they are normally maintained on the bat-bar 1 in a rigid and effective manner; the hooks 7 over the rod 2 and the coil springs 9 immediately adjacent, or in substantially abutting relation to the lower edge of the bat-bar, assuring against accidental displacement of the shanks 6 lengthwise through the holding sleeves 12, and the latter preventing the shanks from swinging away from the face of said bat-bar.

The described pick-up finger units, when damaged, can be quick-detached for repair or replacement by merely bending the ears 11 out of their sleeve form 12 to substantially the initially outwardly projecting position. It is then a simple matter to swing the finger unit away from the bat-bar 1, and to detach the hooks 7 from the rod 2; the latter being accomplished as soon as the coil springs 9 clear the outer edge of the bat-bar 1. The unbending of the ears 11 from their sleeve form 12 can be accomplished with conventional hand tools of the type which are usually available on a harvester, and the operation can be conducted quickly and easily.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a harvester reel which includes a bat bar, a pick-up finger unit comprising a pair of spaced tines having connected shanks on their upper end, a hook on the upper end of each shank for detachable engagement over the upper edge of the bat bar, the shanks then extending down the leading face of the bat bar in adjacent relation thereto, and spring coils between the tines and shanks to project closely under the bat bar when the hooks are engaged with said bat bar whereby the finger unit is held against relative vertical movement, an attachment plate of L-shaped form in section, one leg of the plate extending under the bat-bar in contact therewith and being secured thereto, and the other leg projecting upwardly in contact with said one face of the bat-bar and extending between the shanks and behind the same and its ends forming bendable ears initially projecting laterally from the bat-bar and adapted to be releasably deformed about the shanks to provide retaining sleeves therefor.

2. In a harvester reel which includes a bat bar, a pick-up finger unit comprising a pair of spaced tines having connected shanks on their upper end, a hook on the upper end of each shank for detachable engagement over the upper edge of the bat bar, the shanks then extending down the leading face of the bat bar in adjacent relation thereto, and spring coils between the tines and shanks to project closely under the bat bar when the hooks are engaged with said bat bar whereby the finger unit is held against relative vertical movement, and means to hold the finger unit in engaged relation with the bat bar, said means comprising a metal plate extending lengthwise of the leading face of the bat bar adjacent its lower edge and secured on said bat bar, the plate including end portions projecting back of and initially beyond the shanks, said end portions forming bendable ears adapted to be releasably deformed as sleeves about the adjacent portion of the shanks.

RALPH W. KEENE.

REFERENCES CITED

The following references are of record in the file of this patent:

UNITED STATES PATENTS

| Number | Name | Date |
|---|---|---|
| 113,552 | Myers | Apr. 11, 1871 |
| 292,218 | Hall | Jan. 22, 1884 |
| 430,035 | O'Brian | June 10, 1890 |
| 489,672 | Gibbs | Jan. 10, 1893 |
| 760,666 | Walrath | May 24, 1904 |
| 2,171,025 | Crumb et al. | Aug. 29, 1939 |
| 2,193,138 | Meyer | Mar. 12, 1940 |
| 2,252,180 | Hume | Aug. 12, 1941 |
| 2,431,397 | Harrison | Nov. 25, 1947 |

FOREIGN PATENTS

| Number | Country | Date |
|---|---|---|
| 653,741 | France | Mar. 26, 1929 |